Sept. 8, 1959      S. V. WILSON      2,902,976
TETHERING DEVICE FOR GROOMING SHOW ANIMALS
Filed Aug. 30, 1957      2 Sheets-Sheet 1

INVENTOR.
SYLVESTER V. WILSON
BY
Christian D. Nielsen
ATTORNEY

Sept. 8, 1959 S. V. WILSON 2,902,976
TETHERING DEVICE FOR GROOMING SHOW ANIMALS
Filed Aug. 30, 1957 2 Sheets-Sheet 2
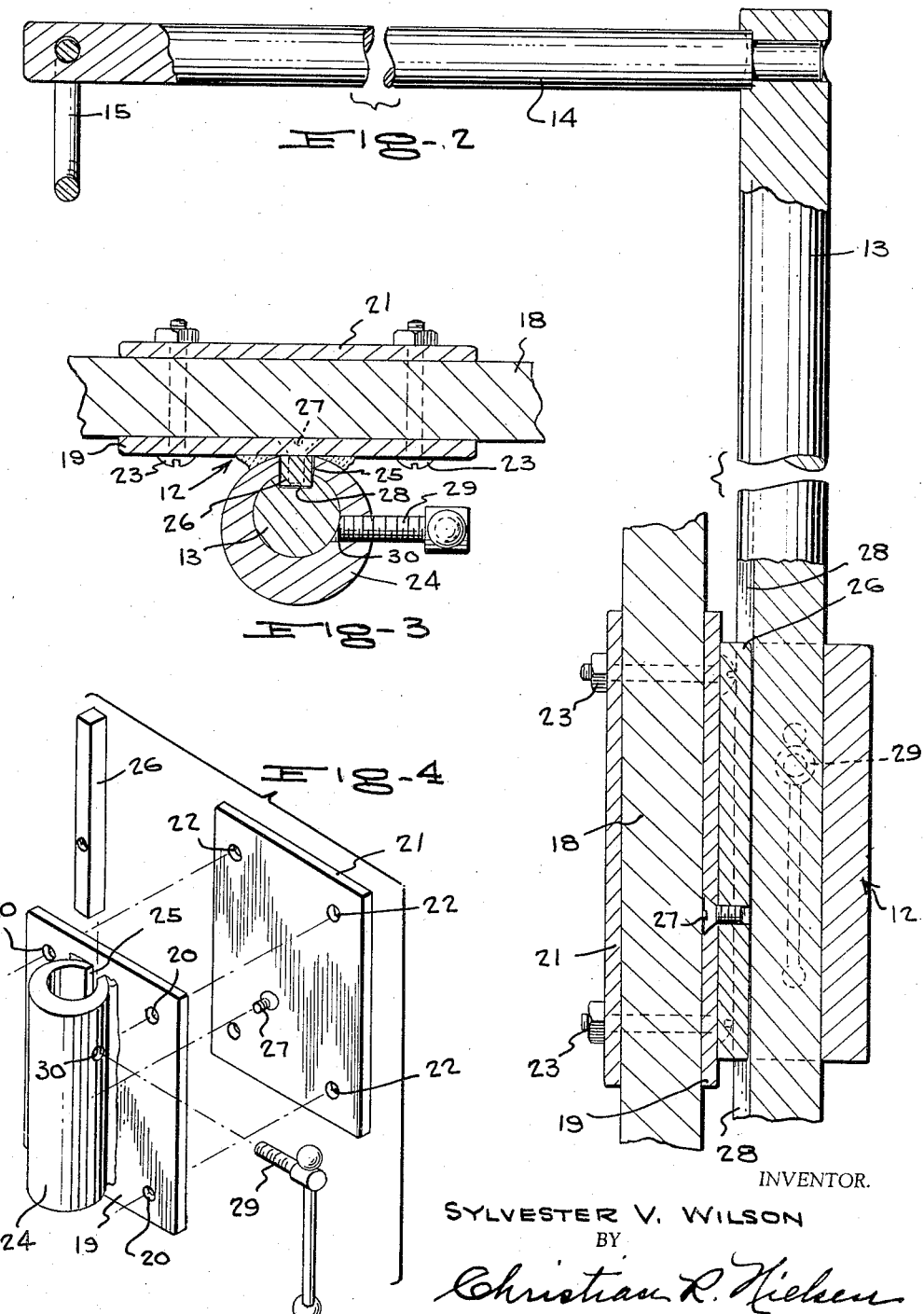
INVENTOR.
SYLVESTER V. WILSON
BY
Christian R. Nielsen
ATTORNEY

United States Patent Office 2,902,976
Patented Sept. 8, 1959

2,902,976

TETHERING DEVICE FOR GROOMING SHOW ANIMALS

Sylvester V. Wilson, Indianapolis, Ind.

Application August 30, 1957, Serial No. 681,386

3 Claims. (Cl. 119—19)

This invention relates to a tethering device for grooming as well as display of show animals, such as dogs, and it consists in the constructions, arrangements and combinations herein described and claimed.

It is the cardinal object of the invention to provide a tethering device for show animals such as dogs wherein the tethering device comprises an adjustable upright post having means for securement to a side of the show box, said post having a horizontally mounted anchorage bar on the outer end of which is secured a ring or the like for attachment to a leash connected with a dog.

More specifically, it is an object of the invention to provide a simple and novel construction of mounting means for support of a tethering post, said mounting means being attachable to the side of a show box, the mounting means including a pair of plates adapted to be mounted upon the inner and outer sides of a wall of the show box, the outer plate having a cylindrical socket provided with a vertically disposed slot, the plate further including a key seated in the slot and rigidly secured to the plate; a slot being formed in the tethering post and receiving said key, said socket having means for securing the post in varying vertical positions enabling a tethering bar or anchorage means on the post to be secured at varying heights to accommodate small or large dogs.

Additional objects, advantages and features of invention will be apparent from the following description considered in conjunction with the accompanying drawings, wherein, Figure 1 is a perspective view of a show box having the tethering device secured thereto.

Figure 2 is an enlarged sectional view taken on the line 2—2 of Figure 1.

Figure 3 is a similar view taken on the line 3—3 of Figure 1, and

Figure 4 is an exploded perspective view illustrating the several parts constituting the post mounting means.

Figure 1:
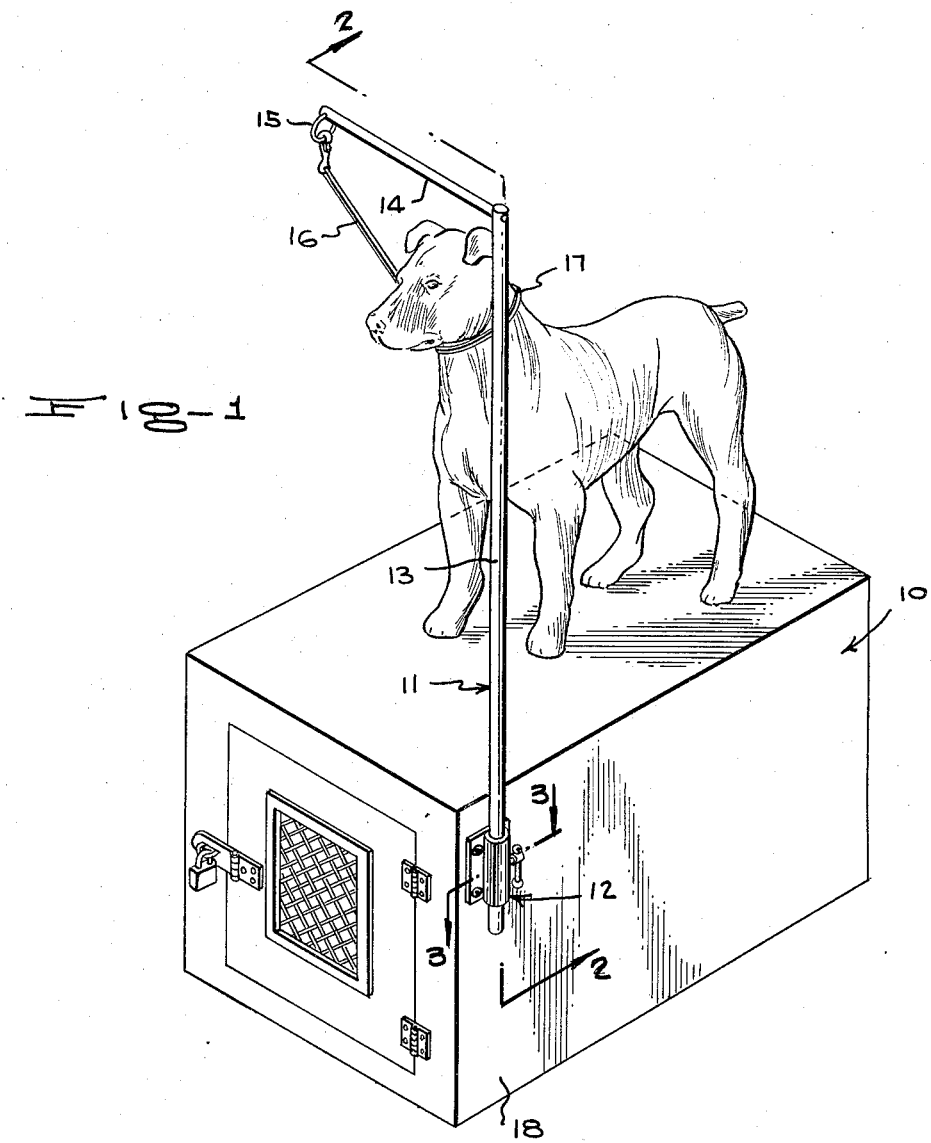

Attention is first invited to Figure 1 of the drawings, wherein a dog show box is generally indicated by the reference character 10, which is of conventional construction and well understood to animal fanciers.

For grooming or display purposes of an animal, the animal is positioned upon the top of the show box as shown, and in order to maintain the animal in the most convenient position for grooming purposes, a tethering device 11 is employed which comprises a bracket 12 for vertical support of a post 13, the latter having a horizontally disposed bar 14 upon the outer end of which there is secured a ring 15 or the like to which there is secured one end of a leash 16, the other end of which is secured to the animal, as at 17.

Since animals to be groomed will vary in height it is necessary to have means for adjusting the height of the bar 14 and this is accomplished by the structure now to be described, reference being made to Figures 2 to 4.

The reference character 18 designates a side wall of the show box which at the upper forward end thereof four bolt holes are drilled for mounting of the bracket 12.

The bracket 12 comprises a plate 19 having four bolt holes 20 adapted to register with the holes formed in the wall 18 and this plate will occupy a position exteriorly of the wall and complemental to the interior of the wall 18 a plate 21 is provided having openings 22 aligned with the openings in the wall 18 and the openings 20 for reception of bolts 23 which secure the plates to the wall.

A tubular socket 24 is secured upon the outer face of the plate 19 as by welding, the socket extending vertically thereof. The socket has a vertical slot 25 for reception of an elongated key 26 which is secured to the plate 19 by means of a screw 27.

The post has a vertical groove or slot 28 slidably receiving the key 26 and in order that the post 13 may be maintained in a rigid adjusted position, a locking screw 29 engaged in a threaded opening 30 formed in a wall of the socket 24 is employed, the inner end of which will impinge upon the post and secure the same in the adjusted positions.

From the foregoing description, it will be seen that upon loosening the locking screw 29, the post 13 and associated bar 14 may be raised or lowered to accommodate the height of the animal to be groomed and then by tightening the locking screw 29, the post 13 and bar 14 will be held in such adjusted position.

The key 26 guides the vertical movement of the post as well as preventing any turning movement thereof, so that the bar 14 will be maintained transversely of the top of the show box.

In the event that the tethering device is not required for display of an animal, it may be readily removed by merely loosening the lock screw 29 and withdrawing the post.

While I have shown and described a preferred form of the device, this is by way of illustration only, and I consider as my own all such modifications in construction as fairly fall within the scope of the appended claims.

I claim:

1. In combination with an animal show box, a member having a socket therein on a side of said box, an upright post adjustably secured in said socket, a horizontal member extending from a top portion of said post over a portion of said box and a tether attached to the free end of said member.

2. In combination with an animal show box, a bracket secured on a side of said box having a vertically disposed socket, an upright post supported in said socket, a horizontal member extending from a top portion of said post, said upright post being vertically adjustable to vary the position of said horizontal member with respect to the top of the show box and a tether attached to the free end of said horizontal member.

3. In combination with an animal show box, a bracket constructed for securement to a wall of said box, said bracket comprising a pair of mounting plates, one of said plates being disposed upon the inner face of the wall and the other plate being positioned upon the outer face of the wall, means securing said plates to said wall, said outer plate having a vertically disposed socket, said socket having a vertically extended slot, an elongated key mounted in said slot and secured to said plate, a post mounted in said socket, said post having a slot of substantial length and receiving said key therein for slidable support of said post, said post further having a horizontal member extending transversely of the top of said show box and having means at the end thereof for securement of an animal leash and a locking screw on said socket for securing said post in an adjusted position to maintain said horizontal member at a desired level with respect to the top of the show box.

References Cited in the file of this patent

UNITED STATES PATENTS

| | | |
|---|---|---|
| 223,872 | Ashford | Jan. 27, 1880 |
| 315,925 | Evans | Apr. 14, 1885 |
| 818,937 | Burden | Apr. 24, 1906 |
| 1,699,308 | Postings | Jan. 15, 1929 |
| 2,346,274 | Raven | Apr. 11, 1944 |
| 2,787,485 | Frisell | Apr. 2, 1957 |
| 2,804,845 | Plumley et al. | Sept. 3, 1957 |